US008914721B2

(12) United States Patent
Dallari et al.

(10) Patent No.: US 8,914,721 B2
(45) Date of Patent: Dec. 16, 2014

(54) TIME RELEVANCE WITHIN A SOFT COPY DOCUMENT OR MEDIA OBJECT

(71) Applicant: International Business Machines Corporation, Armonk, NY (US)

(72) Inventors: Gregory D. Dallari, Poughkeepsie, NY (US); Thomas E. Murphy, Hopewell Junction, NY (US); Adiswong Puiam, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 13/653,884

(22) Filed: Oct. 17, 2012

(65) Prior Publication Data

US 2013/0091424 A1     Apr. 11, 2013

Related U.S. Application Data

(63) Continuation of application No. 13/270,893, filed on Oct. 11, 2011, now abandoned.

(51) Int. Cl.
*G06F 17/00*     (2006.01)
*G06F 17/30*     (2006.01)

(52) U.S. Cl.
CPC .... *G06F 17/30011* (2013.01); *G06F 17/30616* (2013.01)
USPC .......................................... 715/255; 715/256

(58) Field of Classification Search
CPC . G06F 17/24; G06F 17/30011; G06F 17/211; G06Q 10/10
USPC ................................................. 715/255, 256
See application file for complete search history.

(56) References Cited

U.S. PATENT DOCUMENTS

| 6,272,490 | B1 | 8/2001 | Yamakita |
| 6,311,194 | B1 * | 10/2001 | Sheth et al. ................... 715/236 |
| 6,366,296 | B1 * | 4/2002 | Boreczky et al. ............. 715/719 |
| 6,493,731 | B1 | 12/2002 | Jones et al. |
| 6,499,132 | B1 * | 12/2002 | Morley et al. ................. 716/103 |
| 6,715,126 | B1 * | 3/2004 | Chang et al. .................. 715/201 |
| 6,920,583 | B1 * | 7/2005 | Morley et al. ................... 714/32 |
| 7,120,859 | B2 * | 10/2006 | Wettach ........................ 715/202 |

(Continued)

OTHER PUBLICATIONS

O. Alonso, "Temporal Information Retrieval", Computer Science, Aug. 2008, pp. 1-155.*

(Continued)

*Primary Examiner* — Maikhanh Nguyen
(74) *Attorney, Agent, or Firm* — Cantor Colburn LLP; William A. Kinnaman, Jr.

(57) ABSTRACT

A technique is provided for identifying time context in a media object to embed meta tags for the time context in the media object. Input is received of the media object including time relevant expressions. Each of the time relevant expressions in the media object are identified for display to a user. The time relevant expressions in the media object are displayed with an option for the user to enter values for each of the time relevant expressions. The values are respectively included in meta tags. The meta tags are assigned to the time relevant expressions in the media object, such that the meta tags include the values respectively corresponding to each of the time relevant expressions. The meta tags having the values for the time relevant expressions are embedded in the media object, such that the meta tags in the media object are available for searching and indexing.

13 Claims, 11 Drawing Sheets

(56) References Cited

U.S. PATENT DOCUMENTS

| | | |
|---|---|---|
| 7,233,942 B2 | 6/2007 | Nye |
| 7,698,336 B2 | 4/2010 | Nath |
| 7,818,681 B2 | 10/2010 | Abuelsaad et al. |
| 8,001,462 B1 | 8/2011 | Kupke et al. |
| 8,055,688 B2* | 11/2011 | Giblin ............... 707/804 |
| 8,060,514 B2* | 11/2011 | Arrouye et al. .......... 707/741 |
| 8,082,486 B1 | 12/2011 | Damman et al. |
| 8,126,936 B1* | 2/2012 | Giblin ............... 707/804 |
| 2002/0152318 A1 | 10/2002 | Menon et al. |
| 2003/0112268 A1* | 6/2003 | Wettach ............... 345/731 |
| 2004/0122943 A1 | 6/2004 | Error et al. |
| 2004/0168115 A1 | 8/2004 | Bauernschmidt et al. |
| 2005/0097260 A1 | 5/2005 | McGovern et al. |
| 2005/0108639 A1 | 5/2005 | Fields et al. |
| 2005/0198042 A1 | 9/2005 | Davis |
| 2006/0149807 A1 | 7/2006 | Ding et al. |
| 2006/0218492 A1 | 9/2006 | Andrade |
| 2007/0010993 A1 | 1/2007 | Bachenko et al. |
| 2007/0150513 A1 | 6/2007 | Vanden Heuvel et al. |
| 2008/0034003 A1 | 2/2008 | Stakutis et al. |
| 2008/0040359 A1 | 2/2008 | Arrouye et al. |
| 2009/0006982 A1 | 1/2009 | Curtis et al. |
| 2009/0049391 A1* | 2/2009 | Abuelsaad et al. .......... 715/760 |
| 2009/0070373 A1 | 3/2009 | Jeong et al. |
| 2009/0150406 A1* | 6/2009 | Giblin ............... 707/10 |
| 2009/0157680 A1 | 6/2009 | Crossley et al. |
| 2009/0327789 A1 | 12/2009 | Zerbe et al. |
| 2010/0077290 A1 | 3/2010 | Pueyo |
| 2010/0153106 A1 | 6/2010 | Frazier et al. |
| 2010/0228693 A1 | 9/2010 | Dawson et al. |
| 2010/0235760 A1 | 9/2010 | Goh |
| 2011/0067087 A1 | 3/2011 | Thornton et al. |
| 2012/0047436 A1* | 2/2012 | Giblin ............... 715/716 |
| 2012/0072845 A1 | 3/2012 | John et al. |
| 2013/0047071 A1 | 2/2013 | Haubrich et al. |

OTHER PUBLICATIONS

M. Negri et al. "Recognition and Normalization of Time Expressions: ITC-irst at TERN 2004", Feb. 2, 2005, pp. 1-8.*

Document Properties: Security, retrieved from the internet on Sep. 4, 2009, http://www.isilox.com/support/manual/iSiloX/ReferenceManual/DocumentProperties/Security.htm, 3 pages.

Expired Documents; retrieved from the internet on Sep. 4, 2009: http://www.jivesoftware.com/community/docs/DOC-1804, 1 page.

FileNet Content Manager; retrieved from the interent on Sep. 4, 2009; http://www-01.ibm.com/software/data/content-management/filenet-content-manager/, 3 pages.

iSilo features; retrieved from the internet on Sep. 4, 2009, http://www.isilo.com/info/features.htm, 10 pages.

Metadata Miner Catalogue PRO; retrieved from the internet on Sep. 4, 2009; http://metadataminer.com/, 7 pages.

International Search Report—Great Britain: Application No. GB1217190.6; dated Mar. 19, 2013; 5 pages.

O. Alonso, "Temporal Information Retrieval", PhD thesis, UC Davis Computer Science, 2008; UC Davis Computer Science Department; Aug. 2008; pp. 1-155.

M. Negri, et al., "Recognition and Normalization of Time Expressions: ITC-irst at TERN 2004", Centro per la Ricerca Scientifica e Technolgica Via Sommarive 18, 38050, Povo(TN), Italy; Feb. 2, 2005; pp. 1-8.

* cited by examiner

Date: (how recent the page is) | anytime
| anytime
| past 24 hours
| past week
| past month
| past year Usage rights:

Where your keywords show up:

Region:

Numeric range: (e.g. $1500 $3000)

SafeSearch: ● Off ○ On

Identify (special keywords) time relevant words within a media object that contain time relevant meaning based on the relative context of the content in the media object  405

Determine the intended date based on comparing each of the time relevant words to a reference date  410

Assign metadata (having special attributes and values to be utilized as meta tags) to the time relevant words, and embed the metadata (i.e., meta tags) into the media object  415

FIG. 7

| ID | LOCATION | ATTRIBUTE | VALUE |
|---|---|---|---|
| A0 | PAGE1 + OFFSET 155 TO OFFSET 165 | REFERENCE DATE | MAY 8, 2009 |
| A1 | PAGE1 + OFFSET 40 TO OFFSET 44 | TIME/DATE | WEEK OF MAY 8, 2009 |
| A2 | PAGE1 + OFFSET 150 TO OFFSET 154 | NONE | NONE |
| A3 | PAGE1 + OFFSET 10 TO OFFSET 18 | TIME/DATE | MARCH 24, 2009 |
| A4 | PAGE1 + OFFSET 500 TO OFFSET 505 | TIME/DATE | MAY 1, 2009 |
| A5 | PAGE1 + OFFSET 575 TO OFFSET 583 | TIME/DATE | APRIL 24, 2009 |

FIG. 9

IT WASN'T ALL BAD

ATTRIBUTE: REFERENCE DATE
VALUE: MAY 8, 2009

■ ON RAINY SPRING NIGHTS, UNCOUNTED THOUSANDS OF SALAMANDERS, FROGS, AND NEWTS SCURRY ACROSS SMALL STRETCHES OF ROAD FROM NEW ENGLAND TO PHILADELPHIA DURING THEIR ANNUAL MATING MIGRATION. MANY DON'T MAKE IT, SQUASHED BY PASSING MOTORISTS. NOW, THANKS TO THE EFFORTS OF LOCAL CONSERVATION GROUPS, THE HAPLESS AMPHIBIANS ARE GETTING HELP FROM HUMAN ESCORTS WHO SCOOP THEM TO SAFETY AND DIRECT CARS AROUND THEM. "IT'S REALLY COOL," SAID KAITLIN FRIEDMAN, 20, WHO RECENTLY DID THE HONORS IN NEW HAVEN, VT. "YOU FEEL LIKE MAYBE YOU'RE MAKING A SMALL REDUCTION IN THEIR MORTALITY RATES, MAYBE JUST FOR THAT HOUR OR SO."

THE WEEK MAY 8, 2009

ATTRIBUTE: TIME/DATE
VALUE: MARCH 24, 2009

■ PATRICK SCHUSTER OF THE NEW PORT RICHEY-MITCHEL (FLA.) HIGH SCHOOL BASEBALL TEAM HAS SET A STATE PITCHING RECORD WITH FOUR CONSECUTIVE NO-HITTERS. SCHUSTER'S STREAK, WHICH BEGAN MARCH 24, EARNED HIM COVERAGE IN THE NEW YORK TIMES, SPORTS ILLUSTRATED, AND ESPN. ALTOGETHER HE STRUCK OUT 62 BATTERS. THIS WEEK, WHEN A DOUBLE IN THE THIRD INNING OF HIS FINAL GAME AS A HIGH SCHOOLER SNAPPED HIS STREAK, THE STANDING-ROOM-ONLY CROWD OF MORE THAN 1,000 GAVE HIM A ROUSING OVATION. "IT'S DONE NOW AND I DON'T HAVE TO WORRY ANY MORE," SAID SCHUSTER, 18. "I'M GOING TO GO HIDE IN MY ROOM FOR A LITTLE BIT AND STAY OUT OF THE SPOTLIGHT AND ENJOY MYSELF."

*SCHUSTER: UNHITTABLE*

ATTRIBUTE: TIME/DATE
VALUE: WEEK OF MAY 8, 2009

COVER PHOTO OF TED AND DAVID KACZYNSKI COURTESY OF DAVID KACZYNSKI; COVER ILLUSTRATION BY DREW FRIEDMAN

CORRECTIONS

ATTRIBUTE: TIME/DATE
VALUE: MAY 1, 2009

■ DUE TO AN EDITING ERROR, A STORY ON THE WORLD AT A GLANCE PAGE IN THE MAY 1 ISSUE ABOUT COUGAR ENCROACHMENT INTO MIDWESTERN CITIES CONTAINED SOME BADLY OUTDATED INFORMATION. OUR RESEARCH INTO A RECENT SPATE OF COUGAR SIGHTINGS TURNED UP AN ARTICLE ABOUT AN APRIL 2008 INCIDENT IN WHICH POLICE SHOT A COUGAR IN CHICAGO. WE FAILED TO SEE THE DATE ON THAT STORY, AND SO MISTAKENLY REPORTED THAT THIS COUGAR SHOOTING OCCURRED LAST WEEK INSTEAD OF LAST YEAR.

■ IN THE APRIL 24 ISSUE, THE BRIEFING ON AYN RAND ERRONEOUSLY REPORTED THAT ANGELINA JOLIE MIGHT PLAY RAND IN A HOLLYWOOD MOVIE. ACTUALLY, JOLIE IS REPORTEDLY INTERESTED IN PLAYING THE CHARACTER DAGNY TAGGART IN A PLANNED FILM VERSION OF RAND'S ATLAS SHRUGGED.

ATTRIBUTE: TIME/DATE
VALUE: APRIL 24, 2009

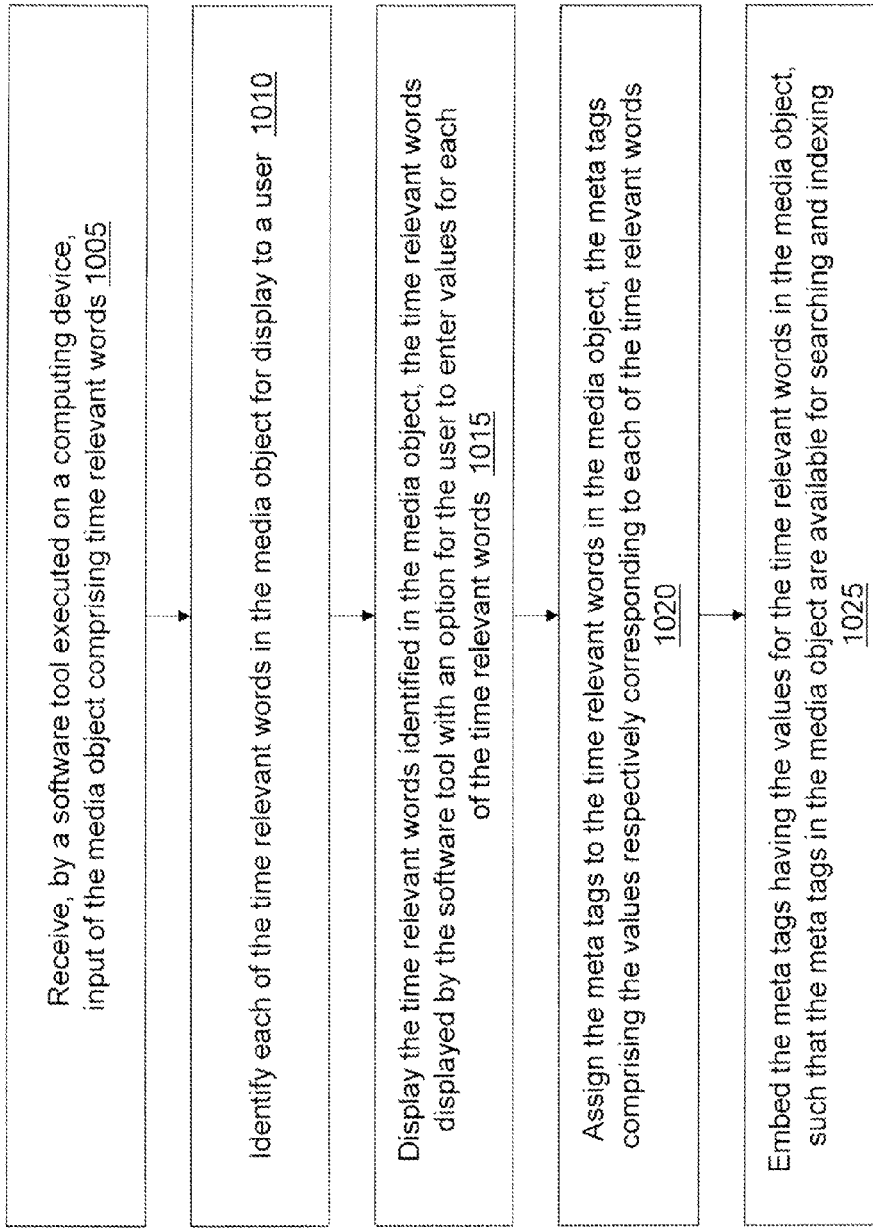

TIME RELEVANCE WITHIN A SOFT COPY DOCUMENT OR MEDIA OBJECT

This is a continuation application that claims the benefit of U.S. Non-provisional application Ser. No. 13/270,893 filed Oct. 11, 2011, the contents of which are incorporated in entirety by reference herein.

BACKGROUND

Exemplary embodiments relate to soft copy documents/objects, and more specifically, to a system for enhancing time relevance references within a document and/or media object.

A soft copy is an unprinted digital document file which may also be a scanned in copy of a printed document. This term is often contrasted with hard copy. A soft copy can usually be viewed through an appropriate editing program, such as word processing programs, database programs, or presentation software, depending on the file type. A soft copy can be transported from one computer to another through file transfer/downloading mechanisms such as ftp or http, as an email attachment, or through USB (universal serial bus) drives and other disk drives. Also, the soft copy can be uploaded to the Internet for viewing by multiple users.

A soft copy of a document is part of electronic media. Electronic media are media that use electronics or electromechanical energy for the end-user (audience) to access the content. This is in contrast to static media (mainly print media or hard copy). The primary electronic media sources familiar to the general public are better known as video recordings, audio recordings, multimedia presentations, slide presentations, CD-ROM (compact disc read-only-memory), and online content.

BRIEF SUMMARY

According to an exemplary embodiment, a method is provided for identifying time context in a media object to provide meta tags for the time context in the media object. The method includes receiving, by a software tool executed on a computing device, input of the media object including time relevant word and identifying each of the time relevant expressions in the media object for display to a user. The method includes displaying the time relevant expressions identified in the media object, in which the time relevant expressions are displayed by the software tool with an option for the user to enter values for each of the time relevant expressions. The values are respectively included in meta tags. Also, the method includes assigning the meta tags to the time relevant expressions in the media object, in which the meta tags include the values respectively corresponding to each of the time relevant expressions.

According to an exemplary embodiment, a computing device is provided that is configured for identifying time context in a media object to provide meta tags for the time context in the media object. The computing device includes a processor and a software tool configured to operate on the processor. The software tool is configured for receiving input of the media object comprising time relevant expressions and identifying each of the time relevant expressions in the media object for display to a user. The software tool is configured for displaying the time relevant expressions identified in the media object, such that the time relevant expressions are displayed with an option for the user to enter values for each of the time relevant expressions. The values are respectively included in meta tags. Also, the software tool is configured for assigning the meta tags to the time relevant expressions in the media object, in which the meta tags include the values respectively corresponding to each of the time relevant expressions.

According to an exemplary embodiment, a computer program product is provided for identifying time context in a media object to embed meta tags for the time context in the media object via a computing device. The computer program product includes a computer readable storage medium having computer readable program code embodied therewith. The computer readable program code is configured for receiving input of the media object including time relevant expressions, phrases or references and identifying each of the time relevant expressions, phrases or references in the media object for display to a user. The computer readable program code is configured for displaying the time relevant expressions, phrases or references identified in the media object, such that the time relevant expressions, phrases or references are displayed along with a selection of semantically equivalent, but less ambiguous alternatives with an option for the user to enter values for each of the time relevant references. Once determined, the respective values are registered in the meta tags. Also, the computer readable program code is configured for assigning the meta tags to the time relevant expressions, phrases or references in the media object, in which the meta tags include the values respectively corresponding to each of the time relevant expressions, phrases or references.

According to an exemplary embodiment, a method is provided for identifying time context in a media object. The method includes receiving, by a software tool executed on a computing device, input of the media object including time relevant expressions. The method includes identifying each of the time relevant expressions in the media object for display to a user in response to the user typing in a document of the media object and/or a scan being performed for temporal accuracy of the document. Also, the method includes displaying the time relevant expressions identified in the media object, in which the time relevant expressions are displayed by the software tool with a suggestion of an alternative wording for the time relevant expressions and/or an option for the user to correct the time relevant expressions.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

FIG. 2 illustrates a view of advanced search criteria available in most search engines which are focused on the publication date, creation date, and/or recent date of the article published rather than on the temporal context of a search argument.

FIG. 4 is a high level diagram via a software tool for allowing an author, editor, and/or software service to identify and return time relevant words and phrases in a media object, and to store a meta tag for each time relevant word and phrase according to an exemplary embodiment.

FIG. 7 illustrates a view displayed to an author and editor in which a software tool has attached/assigned fields as metadata to each time relevant word and phrase according to an exemplary embodiment.

FIG. 9 illustrates a view displayed to a reader of highlighted words that define potentially ambiguous time relevant terms and phrases according to an exemplary embodiment.

FIG. 10 illustrates a method for identifying time context in a media object to embed meta tags for the time context in the media object according to an exemplary embodiment.

DETAILED DESCRIPTION

When reading articles in various media (printed or otherwise) there is a relevance of time which is generally implied by the date in the margins or the title page of the original publication. There is usually a time relevance associated with the original publication whether a newspaper, magazine, or perhaps a periodical, or whether a newsletter mailed, emailed, or web-published.

In a form of reuse, many articles are recycled and republished in various web venues, quite often simply reprinting the article word for word as originally published (with or without the publication date). Articles typically have an inherent reference to the publication date (whether current or the past hundreds of years).

The problem, however, is that authors of such articles never envisioned their context of date (e.g., in the margins) to be removed and the article reused in an electronic format without the date. Consequently, as these articles are republished at later dates in different venues (e.g., on the Internet, syndicated copy media, magazines, or other periodicals) confusion may be injected. In addition, such (admittedly natural) writing style renders searching virtually useless. Prior to the Internet, smart phones, and online media, the main source of information was available in printed (hard copy) newspapers and the date was anchored on each page. However, with the Internet, word processing files (such as Word® software), electronic presentations (such as PowerPoint® software), etc., the author now has to be diligent in anchoring time (dates) to his or her articles. Many authors do not take the diligence to anchor their articles to time.

Figure 1:
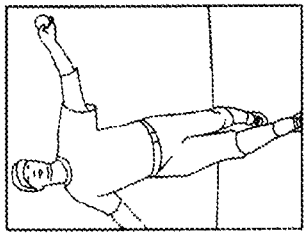
FIG. 1 illustrates an excerpt with potentially ambiguous time relevant words and phrases according to an exemplary embodiment.

As an example, consider the following ambiguous temporal terms and/or references that are taken from a simple magazine excerpt 100 in FIG. 1. The ambiguous terms, time relevant expressions, time relevant words, and/or time references in the magazine excerpt 100 are "March 24," "May 1," "last week," "last year," and "April 24." This is simple every day language but can be quickly taken out of context especially if syndicated or redistributed without having the reference date (in the bottom left corner margin). This may be considered as a growing problem with the current exponential growth of electronic media.

With respect to reusing (providing) this article as electronic media on networks (including the Internet) and/or storage devices (including optical disc storage (e.g., Blu-Ray Disc™, digital versatile disc, compact disc, etc.), solid state storage, tape, etc.), this article has some shortcomings in terms of searchability. It is contemplated that any type of storage (including off line storage) and/or medium may be utilized to store and communicate electronic media (which includes any type of media object or information); accordingly, any Internet examples discussed herein are for explanation purposes and are not meant to be limiting. Consider an example in which a user may want to perform a search to identify references to no hitters in the March 2009 time frame. An Internet or web search engine (such as, e.g., Google® search engine, Bing® search engine, etc) might not readily identify this article and would (at best) be plagued with many false positive search hits. Authors typically use time relevant words such as "today", "last week", "last quarter", "last year", and so forth. However, searches within the time context of those intended words are not effective, because a user cannot enter the contextual date into a search engine and find the relative or timely article other than using the reference to a possible publication date (published date) of the article itself. With the leading edge technology currently leaning toward business intelligence, analytics, and data mining, this may be considered an obstacle.

The advanced search criteria available in most search engines are focused more literally on the publication date, creation date, and/or recent date of the article published rather than on the temporal context of a search argument, and is in effect limited to such filtering. The following example from an advanced search option sub-menu of an Internet search engine (such as, e.g., Google® search engine) offers an illustration, as shown in FIG. 2. FIG. 2 illustrates a view 200 of advanced search criteria of an Internet search engine providing additional options for searching web pages (including articles) relative to time. In the advanced search criteria of view 200, the temporal phrases are particularly anchored to the original creation or author date, but the search sub-menu of the advanced search criteria is based on the publication date (if available) on the Internet. In an article (like the article in magazine excerpt 100), the temporal phrases referencing time may not be discovered utilizing the advanced search criteria because the publication date can be different from the temporal phrases. Also, the search is limited because if an article was originally written prior to the last year which is being ported from hardcopy (or other media) to the web (i.e., Internet), the article (like the article in magazine excerpt 100) most likely used the time relevant words (such as "today," "last week," "last quarter," "last year," etc.) discussed above and the article has been created (e.g., uploaded and/or stored on a host server) on the web today. The relevance of the aforementioned words is unlikely to be found via searching by an Internet search engine. For example, it was determined that certain search engines are limited based on the currency of the date. Creation of the article was prior to the last year, but on the web it is "today" therefore eliminating the true context of the article.

Returning to the article in the magazine excerpt 100 in FIG. 1, assume someone is interested in searching and finding the events highlighted in the above example for the article, and for the sake of discussion, assume the article included the reference to a "no hitter last week". A search of no hitter and last week executed within one week after the article publication date (May 8, 2009), would logically find the article and the context would have been correct. However, if the same search were performed a month or a year later, mixed results would be experienced. Quite likely, since the article was published well before the advanced sub-menu's reference in time (in the view 200 of advanced search criteria), one would need to use the past month or past year categories in view 200 of the advanced search criteria. Then, quite likely, there would be hits throughout the entire period from the current date (at the time of this present search) looking backward to the specific publication date, with no time context to the intended time period referenced in the article (1st week of May 2009) as intended by the article.

A (Internet) search engine is an information retrieval system designed to help find information stored on a computer system or network of computer systems such as the Internet or World Wide Web (typically referred to as web). The terms Internet and web (or network) may be used interchangeably. The search results are usually presented in a list and are commonly called hits. Search engines help to minimize the time required to find information and the amount of information which must be consulted, akin to other techniques for managing information overload. To provide a set of matching items that are sorted according to some criteria quickly, a search engine will typically collect metadata (e.g., meta tags) about the group of items under consideration beforehand through a process referred to as indexing. The index typically requires a smaller amount of computer storage, which is why some search engines only store the indexed information and not the full content of each item, and instead provide a method of navigating to the items in the search engine result page. Alternatively, the search engine may store a copy of each item in a cache so that users can see the state of the item at the time it was indexed, for archive purposes, or to make repetitive processes work more efficiently and quickly.

A web crawler is a computer program that browses the World Wide Web in a methodical, automated manner or in an orderly fashion. Other terms for web crawlers are ants, automatic indexers, bots, web spiders, and web robots. This process is called web crawling or spidering. Many sites, in particular search engines, use spidering as a means of providing up-to-date data for indexing. Web crawlers are mainly used to create a copy of all the visited pages for later processing by a search engine that will index the downloaded pages to provide fast searches for users.

Returning to the example in FIG. 1, after web crawlers go through the indexing phase of registering words within the content (such as the article in FIG. 1), the index simply includes the words without time context; hence using a search engine to search on the phrase last week will quite naturally trigger on those specific words having been indexed in various articles, normally finding hits that could be years in the past.

As for a user it is easy to take one of the aforementioned type of articles out of context. One need not look far, as the same clipping of the excerpt in FIG. 1 has a correction (identified as portion 110) in which there was an error about a cougar shooting which was reported as last week instead of last year. Professional news organizations make these mistakes more now than ever with the syndicated reuse of news articles during these declining years of the newspaper industry and the rising electronic era.

Exemplary embodiments provide a technique for automatically setting meta-tag information (whether if it is Internet HTML (hyper text markup language) tags, XML (extensible markup language) tags, and/or other file/object/media specific tags) that are useful within the (currently) available search engine capabilities. Exemplary embodiments provide one or more software applications configured to (automatically) identify the time context of a word or phrase and assign a specific (searchable) value to a transparent meta tag (that will be) embedded in the object.

When writing an article, how many times have authors written the word "today", "last quarter", "last year", etc., where the author assumes the reader is in the present day (and/or will always be in the present day). Looking at the clipping of the article in FIG. 1, consider if the web crawler did not notice or scan for the May 8, 2009 publish date (normally printed outside the article or not provided with the article), and note the middle story says " . . . which began March 24 . . . ". How would the reader know which year that (March 24) occurred; one can only assume that it was March 24, 2009 because of the time stamp. However, the newspaper or author may be making the same mistake of relevance of time. That is, the week of March 8, 2009 time stamp on the article makes it appear to a web crawler (if even recognized) that March 24 is in the year of 2009 (when really March 24 could be in the past).

Authors and readers of documents typically use time relevant words such as "today", "this quarter", "this year", etc., which time relevant words are all date based. As the number of documents grows, it has been found that many documents although quite useful, often have relative references to a specific point in time or other such fluid/changing values. As a reader, the one challenge is to understand the intended time reference in context. As an author, a challenge is to create the proper time reference.

According to an exemplary embodiment, a software tool 20 (shown in FIG. 3) is configured to receive/download/scan a historical document (e.g., a hardcopy for this example, but could be in any media format) and convert the document to an electronic format (an electronic media object, i.e., a soft copy). The software tool 20 is configured to anchor a date within the metadata of the electronic media object to give a relative context to time relevance words (such as the words mentioned above). The software tool 20 can make a real time change and/or append an addendum to the electronic media object (soft copy document) to reconfigure the article, such that the electronic media is searchable on a network (such as the Internet) or enclave. Also, the software tool 20 can make a real time change and/or append an addendum to the electronic media object such that the electronic media is on a desktop of a Windows® operating system using a file search, Google® desktop, and/or any other operating system search facility/function. The software tool 20 provides improvements in this field which will benefit deep analytical and language interpretation. Additionally, if searching on a date when the article says "last week", "last month", "next week", etc., users performing a web search (e.g., using an Internet search engine such as the Google® search engine) would no longer miss key documents (i.e., web documents and/or web pages) and greatly reduce the amount of false positives returned.

Figure 3:
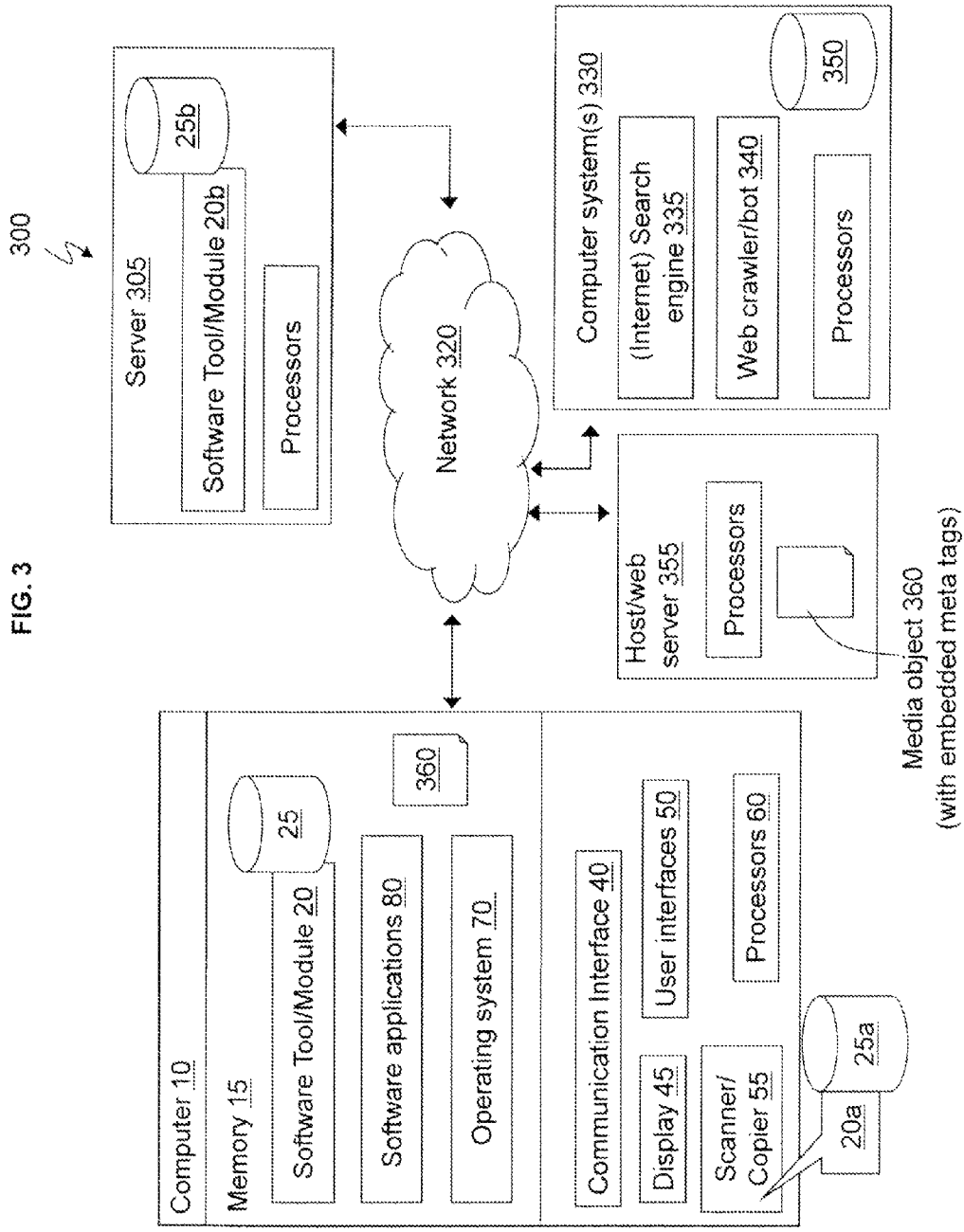
FIG. 3 is a block diagram of a system according to an exemplary embodiment.

Now turning to FIG. 3, a block diagram of a system 300 for providing time content to time relevant words in an electronic media object (documents) in accordance with an exemplary embodiment. Note that media object is meant to refer an electronic file that can be stored in an electrical and electrical mechanical manner. The system 300 depicts a computing device 10 which may be one or more servers, mobile devices (such as a smart phone, tablet, laptop computer, etc.), or any type of computer processing device. The computing device 10 may include and/or be coupled to memory 15, a communication interface 40, a display screen 45, user interfaces 50, processors 60, operating system 70, and software tools 20. The communication interface 40 comprises hardware and software for communicating over a network 320 (such as the Internet (i.e., World Wide Web)) including a wired and/or wireless network. The network 320 includes routers, servers, switches, cell phone towers, and other network elements for processing and routing data (including packets). The user interfaces 50 may include, e.g., a track ball, mouse, pointing device, keyboard, keypad, touch screen, etc, for interacting with the computing device 10, such as inputting information, making selections, etc. The computing device 10 includes memory 15 which may be a computer readable storage medium. The memory 15 stores the operating system 70, and the operating system 70 is configured to generally operate the functions of the computer system 10.

One or more software applications such as the software tool 20 (module) may reside on or be coupled to the memory 15, and the software tool 20 comprises logic and software components to operate and function in accordance with exemplary embodiments in the form of computer executable instructions. The software tool 20 may include a graphical user interface (GUI) (displayed on the display screen 45) which the user can view and interact with according to exemplary embodiments. Although the software tool 20 is shown as a single element in FIG. 1 for conciseness, the software tool 20 may represent numerous software components (or modules) according to exemplary embodiments. Also, the functions of the software tool 20 are represented in whole or part as software tools 20a and 20b, and any discussion for the software tool 20 applies to software tools 20a and 20b. The software tool 20 may include and/or access a database 25. The database 25 can be an ontology database and/or temporal database which include time relevant keywords to be matched against an electronic media object 360 by the software tool 20. An identical database 25 is represented in whole or part as database 25a and 25b, and any discussion for the database 25 applies to database 25a and 25b. The software tool 20 may include an ontology engine configured to perform a search based on the time relevant words in the database 25 as discussed herein.

For example, the software tool 20 is configured to search the electronic media object 360 for these time relevant words in the database 25, and then identify/display on the display 45 the time relevant words, phrases, and references to the user (e.g., author, editor, etc., of the media object 360 being searched). For each time relevant word identified (highlighted) on the display 45 to the author, the software tool 20 is configured to ask and allow the author to input a value (such as a date) to correspond to the time relevant word. The software tool 20 is configured to store the value for each time relevant word in the electronic media object 360 as a meta tag. Then, the software tool 20 embeds/stores the meta tags respectively corresponding/anchored to each time relevant word in the electronic media object 360 itself, such that the embedded meta tags and the electronic media object 360 form a single searchable package identified as electronic media object 360. This electronic media object 360 now has a value embedded as a meta tag (including metadata in metadata table 800 shown in FIG. 8) for each ambiguous time relevant word identified in the electronic media object 360 by the software tool 20, such that a web crawler can search, find, and index these values for the time relevant words in the electronic media object 360. For example, a web crawler 340 in a computer system 330 (e.g., server farm) of an Internet search engine company/entity can search for and index the meta tags (which are the values of the (ambiguous) time relevant words of the electronic media object 360) in an indexing database 350. Subsequently or concurrently, when a search engine 335 (such as the Google® search engine) is tasked to search (in the index database and/or over the network 320) for terms including and/or combined with the values in the meta tags (corresponding to the ambiguous time relevant words in the electronic media object 360), the search engine 335 will return (locate) the electronic media object 360 having the meta tags (date values), e.g., hosted on the server 355. The electronic media object 360 may be a web page and/or in a web page hosted by the host server 355 on the Internet (i.e., over the network 320). The author/user may have previously uploaded the electronic media object 360 to the host server 355, which can now be properly indexed by the web crawler 340 and searched/located by the search engine 335.

As discussed herein, an exemplary embodiment provides a technique for allowing an author, an editor, a software service (e.g., provided by an entity of server 305) and/or the software tool 20 to recognize/display the relative context (e.g., word context) of object entities (which are time relevant words and word phrases in the electronic media object 360), to highlight and/or alert for ambiguity for time relevant words and phrases, to offer alternatives for time relevant words and phrases, and to attach and/or store portable meaningful meta tags (attributes/values) within the electronic media object 360 for these time relevant words and phases. These meta tags provide the ability for conventional indexing and searching by web crawlers 340 and search engines 335. Also, the meta tag information may be stored within the media object or externally as taught during our other invention.

In one implementation, the software application 80 can be a word processing application or any other software application for creating a document, and the software application 80 integrates the features of and/or works in cooperation with the software tool 20 (e.g., as a plug-in, optional tool, etc.). For example, features of the software tool 20 can be integrated in a conventional word processing application, such as Word® software. As the user types in (i.e., edits) a word processing document of the software application 80, the software tool 20 can scan the entire document of the electronic media object 360 much like the deployment of a spell/grammar checker at completion of the media object 360 and/or dynamically as the media object 360 is being edited (e.g., in the word processing application). The software tool 20 is configured to display on the display 45 a warning/prompt while the user is writing/authoring the document such that if temporal ambiguity is observed by the processing program (now incorporating the software tool 20), the user may be prompted with an option to better articulate a temporal reference for the time relevant words or phrases and/or the user may be provided with a suggestion of alternative wording for the time relevant words and phrases. Further, the software tool 20 is configured so that the user can set a varied metric to identify and/or target a degree of temporal accuracy. For example, if the temporal accuracy of the software tool 20 is set to "absolute" (e.g., which may be a strict adherence to providing temporal accuracy), then the software tool 20 is configured to highlight (on the display 45) the ambiguity in a reference to, e.g., "Last April" and then suggest (display on the display 45) that the author considers "April 2011" as an alternative wording. Hence, the software tool 20 can operate in real time during the authorship phase, as well as in a batch (post-authorship) manner. In one implementation, the software tool 20 can provide real time processing for identifying and correcting time relevant words and phrases (in terms of temporal wording) to be more explicit, without storing any metadata corresponding to the time relevant words for the media object 360. Although an example was discussed for an absolute temporal accuracy above, it is understood that the metric for temporal accuracy (applied by the software tool 20) can be varied by the user to include, e.g., no degree of temporal accuracy, a low degree of temporal accuracy, a medium degree of temporal accuracy, a high (absolute) degree of temporal accuracy, and so forth. At anytime, the user can initiate a scan of the document for temporal accuracy as discussed herein.

FIG. 4 illustrates a high level diagram 400 via the software tool 20 of allowing an author, editor, and/or software service to identify and return time relevant words and phrases in a media object and store a meta tag for each time relevant word and phrase according to an exemplary embodiment.

The software tool 20 is configured to identify time relevant words (special keywords) within the electronic media object 360 (e.g., file, components, sections, documents, etc.) in which the time relevant words contain a time relevant/sensitive meaning based on the relative context of the content in the media object 360 at block 405. The media object 360 is stored/captured in electronic format, e.g., in the memory 15. For example, the software tool 20 may identify each of the time relevant words in the media object 360 for display to a user in response to the user typing in a document of the media object 360 and/or a scan being performed for temporal accuracy of the document. The time relevant words can be displayed a suggestion of an alternative wording for the time relevant words and/or an option for the user to correct the time relevant words.

The software tool 20 is configured to automatically determine the intended date based on comparing the time relevant words to a reference date at block 410. The reference date may be requested from the author (editor), and the author inputs the reference date to be used by the software tool 20. Also, the reference date may be inferred from the media object 360 itself, e.g., the reference date may simply be the media object publish date (as determined by a scan performed by the software tool 20 and/or input by the author/editor). Additionally, the software tool 20 is configured to determine (or the user can input) the reference date based on the context of the content itself in the media object 360. For example, the software tool 20 is configured to determine that an article written/published in 2008 detailing the 1929 market crash referring to the previous year should cite 1928 (rather than 2007) in the meta tag associated with the time relevant phrase previous year. The software tool 20 is configured to scan the media object 360 to determine borders, margins, box dividers, and column dividers. Also, the software tool 20 determines/distinguishes the content (i.e., the text of the article which may be within a box, column, border, and/or any encapsulated form) of the media object 360 from text surrounding the content. Text surrounding/outside of the content may be text in the margins, borders, and/or generally outside of the encapsulated content. The software tool 20 is configured to determine that a date found outside (e.g., in a header, footer, etc.) of the content is not (automatically) utilized as the reference date that is used to generates values for the meta tags. However, the software tool 20 is configured to distinguish a date found in a title from a date in an outside margin (like the header, footer, etc.) and will utilize the date (e.g., month, day, year, etc.) in the title as the reference date.

At block 415, the software tool 20 is configured to assign metadata, having special attributes and values to be utilized as meta tags, to the time relevant words, and the software tool 20 embeds the metadata (i.e., meta tags) into the media object 360. Further information regarding assigning and embedding metadata is disclosed in application Ser. No. 12/555,171 filed Sep. 8, 2009, entitled "Processing Special Attributes Within A File" which is hereby incorporated in its entirety by reference.

In one implementation, the software tool 20 may attach the metadata along with the media object 360 instead of embedding the metadata.

Execution of the scanning/inference logic (for identifying and highlighting the time relevant words for display to the user) can be done via stand software components in the software tool 20 and/or via software services shown as the server 305 having the software tool 20b. Also, the software tool 20 may be integrated as a feature in a word processing program. The software tool 20 is configured for an author and/or editor to override meta tags automatically assigned by the software tool 20 and assign meaningful meta tags himself. In one embodiment, the author could manually highlight and assign desired meta tags via the software tool 20. Time sensitive/relevant words, phrases, and terminology within electronic media object 360 (e.g., text, audio, etc.) can readily be identified using existing software modified the software tool 20 as discussed herein. Optical character recognition (OCR) software can be designed to do this in conversion to text applications. The technique of exemplary embodiments goes beyond existing software by identifying, interpreting, and assigning these time relevant words and phrases into succinct time references (time values in corresponding meta tags) for direct portable inclusion within and/or associated with the electronic media object 360.

Figure 5:
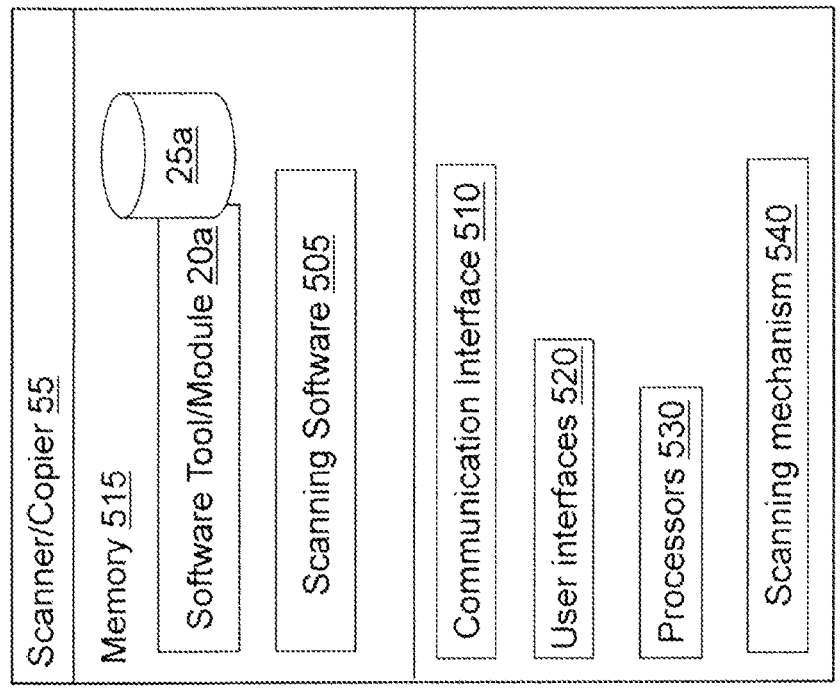
FIG. 5 illustrates details of an image scanner, printer, and copier according to an exemplary embodiment.

In one implementation, the software tool 20 can be integrated into a scanner, such that the scanner 55, to provide enhanced scanning. The scanner 55 may be configured with functions of scanners and printer combinations by Hewlett-Packard, Seiko Epson®, or any other scanner and printer companies. FIG. 5 illustrates further details of the scanner 55 having the software tool 20a as discussed below. The software tool 20 (designated as software tool 20a in the scanner 55) is configured to allow post OCR-scanned documents to be processed to create pertinent meta tags which are to be indexed with the resultant soft copy output (i.e., the media object). This further improves on paper-less office solutions.

Once the time relevant word and relevant point in time (i.e., the relevant point in time is the value in a meta tag for that particular time relevant word) has been input/established by the author, editor, and/or software tool 20 (which may be a software service offered by an entity through the server 305), the author/editor has the an option displayed by the software tool 20 to correct and/or adjust the wording (of the value) appropriately based on the actual date that should be input as the value.

The search engine 335 would be able to search, determine, and locate a definitive point in time for each time relative word by finding its corresponding meta tag (having the date and reference as a value, such as first week in Jan. 2011). Additionally, the embedded meta tag (via the software tool 20) allows a reader to view (via, e.g., a mouse over) the value of the meta tag assigned/corresponding to each time relevant word in the document (i.e., the electronic media object 360) which provides the reader a definitive point in time for any ambiguous time relevant words and phrases. As presented in application Ser. No. 12/555,171 filed Sep. 8, 2009, the author/editor has the ability to assign special attributes/values to such time relevant words as discussed herein. The software tool 20 can indentify New Year's Day in the media object 360 as a time relevant phrase. The software tool 20 and/or the author utilizing the software tool 20 can assign a special attribute (which is a value in a corresponding/assigned meta tag) of Jan. 1, 2010 for New Year's Day. In the media object 360, the actual date of Jan. 1, 2010 can be displayed on the display 45 to the reader (if a mouse pointer hovers over "this New Years Day" (time relevant phrase)) and can be readily discovered in meta data by the search engine 335, thus providing an actual date for this time relevant phrase (when none was originally provided). Both the discovery software (e.g., search engine 335) and the direct beneficiary (the user/reader) will benefit by having the ability to discern an actual date based off of time sensitive/relevant words, thereby eliminating the confusion of time relevance within documents.

Returning to FIG. 3, the computer system 10 may include and/or be operatively connected to the image scanner 55 (e.g., a fax, copier, and printer device). The scanner 55 is configured to scan in a hard copy of a document (such as a magazine, newspaper, dissertation, journal, periodical, etc., and output a digital image (such as the electronic media object shown in FIG. 1). In computing, an image scanner (such as the scanner 55) is a device that optically scans images, printed text, handwriting, and/or an object, and converts them to a digital image. An example of the scanner 55 may include variations of the desktop (or flatbed) scanner where the document is placed on a glass window for scanning. Other examples of the scanner 55 may be hand-held scanners, where the device is moved by hand, and mechanically driven scanners that move the document. Further, details of the scanner 55 are illustrated in FIG. 5. In FIG. 5, the scanner 55 may include memory 515, a communication interface 510 (e.g., for communicating with the computer system 10 and the network 320), user interfaces 520 (e.g., keypad, touch screen, display screen, etc.), processors 530, and a scanning mechanism 540. The scanning mechanism 540 includes the hardware and software (such as scanning software 505) for scanning and copying an image. The scanning mechanism 540 may include a charge-coupled device (CCD), a CCD array, a drum scanner, and/or a contact image sensor (CIS) as the image sensor.

As discussed herein, the scanner 55 may include the software tool 20a (e.g., as an add-on or plug-in) along with a database 25a of time sensitive/relevant words and phrases. The scanner 55 can be a stand alone device in which the software tool 20a with database 25a can operate and function (identically or modified as desired) as discussed herein for the software tool 20 and database 25.

Figure 6:
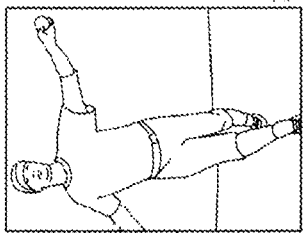
FIG. 6 illustrates a view displayed on a display to an author and editor of an excerpt in a media object after potentially ambiguous time relevant words and phrases are identified according to an exemplary embodiment.

An example was provided above for the magazine excerpt 100. The hard copy of the magazine excerpt 100 has been scanned in by the scanner 55 and can be represented as a soft copy (file). In this example, this electronic soft copy (file) is media object 360. The software tool 20 receives the media object 360 for processing. FIG. 6 illustrates a view 600 displayed on the display 45 to the author/editor of the magazine excerpt in media object 360 after the software tool 20 has identified potentially ambiguous time relevant words and phrases within the media object 360 according to an exemplary embodiment.

The task of identifying the time relevant words (special keywords) can be accomplished by the software tool 20 scanning the magazine excerpt of the media object 360 (similar to a spell/grammar check within an application). As mentioned above, the software tool 20 may contain an ontology engine which can utilize deep analytics. The ontology engine can be used to scan the document based on a specific context such as time and/or date. The resultant document shown as view 600 will contain the related words/terms/phrases (i.e., time relevant words) highlighted. The time relevant words may be displayed in the view 600 (on display 45) with a different color, enclosed in a box, enclosed in a circle, and/or with any type of distinguishing feature so that the author can recognize these time relevant words and phrases. Also, the search for time relevant words is not restricted just to (textual) documents, but can be applied to audio/video multimedia formats such as, mp3 (MPEG audio layer I, II, and III) format, wmv (Windows® media video) format, avi (audio video interleave) format, etc. Note that in one implementation the scanner 55 (which could be a stand-alone machine) and/or the computer system 10 may invoke a software service. For example, the media object 360 may be sent to the software service of one or more servers 305 (e.g., including one or more deep analytics machines, analytical software, and/or data mining software as understood by one skilled in the art) for processing via the network 320. The software service of the software tool 20b would execute the processing discussed above and below for the software tool 20. The software service of the software tool 20b would flag ambiguous temporal references (i.e., flag time relevant words and phrases), offer alternative wording to the user, and then provide the absolute value within the corresponding meta tags. The software service of the software tool 20b provides the user with the option (e.g., in a graphical user interface) to accept or reject these changes. As discussed herein, it is contemplated that any processes executed by the software tool 20 of the computer system 10 and the software tool 20a of the scanner 55 can be implemented by the software service of the software tool 20b.

Figure 7:
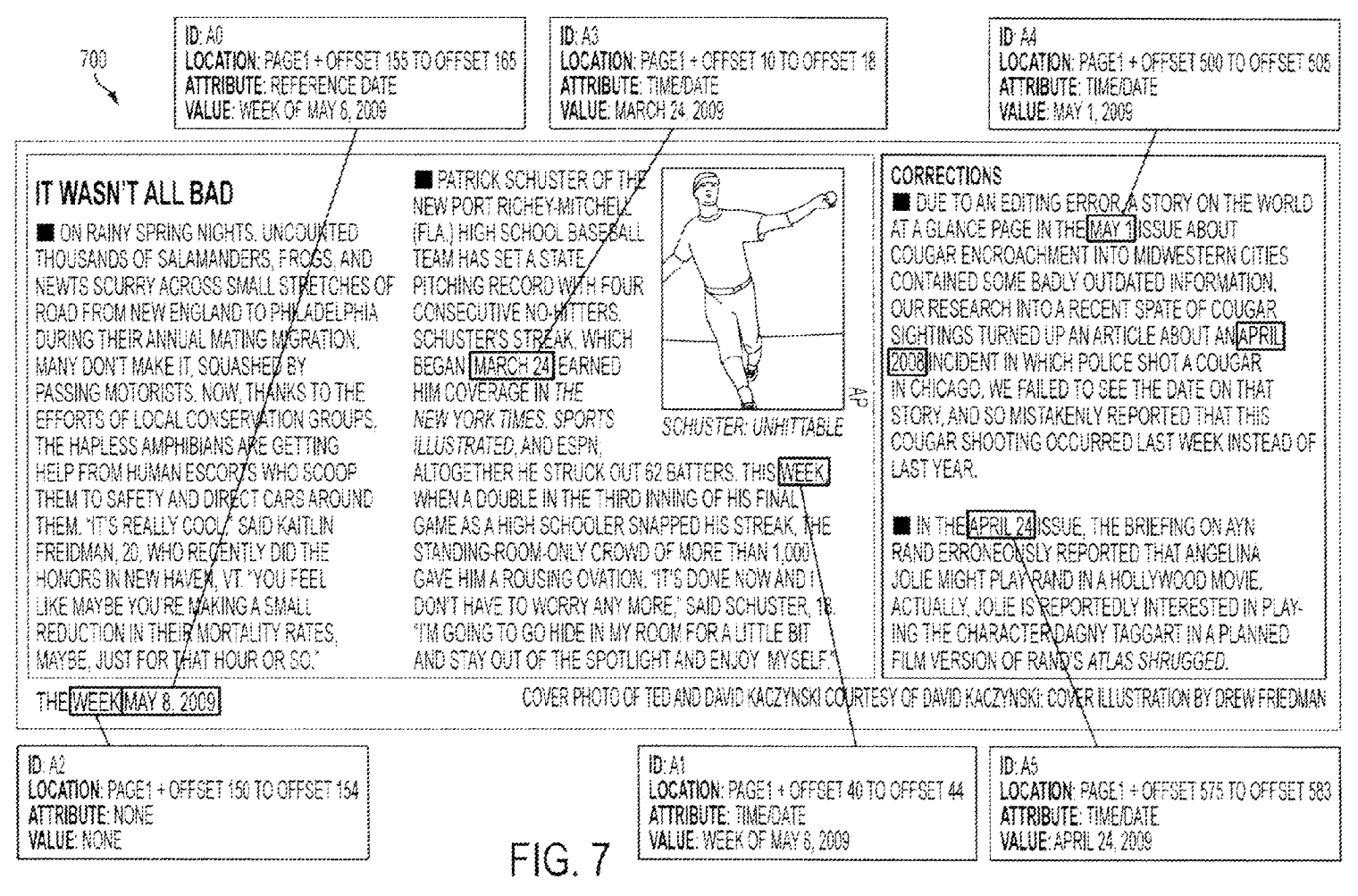

FIG. 7 illustrates a view 700 of the processed media object 360 displayed on display 45 to the author in which the software tool 20 has attached/assigned fields (as metadata) to each time relevant word and phrase according to an exemplary embodiment. The assigned fields may each include an identification (ID) field, a location field, an attribute field, and a value field in a metadata box that corresponds to a time relevant word, as shown in view 700.

After the (related keywords) time relevant words have been identified by the software tool 20, the date and/or time value for the time relevant words can be computed by the software tool 20 based on a reference date. A reference date can be provided directly by the editor/author and the reference date can be automatically calculated by the software tool 20 based off of the current date (e.g., as the author/editor writes the document in a word processing software application).

The software tool 20 is configured to input the data for the identification field, which is unique for each metadata box. The ID field is a unique identifier for the time relevant word/term/phrase/section. A special attribute with the calculated value can then be assigned by the software tool 20 to the highlighted time relevant words/terms/phrases as shown in view 700. The editor will have the option presented by the software tool 20 to modify the values and/or attribute for each time relevant word and phrase. The location field specifies the location where the attribute is within the document of the media object 360; this can be automatically computed/input by the software tool 20 and provided to the editor. The software tool 20 may provided start and end location in the location field. The attribute field is the attribute assigned to the time relevant word/term/phrase/section. The value field is the value of the attribute; the value field contains the actual value of the time relevant word.

When the software tool 20 determines and/or receives input of the reference data, the software tool 20 is configured to input the term reference date into the attribute field and the input, e.g., May 8, 2009 (the actual reference date), into this value field for the metadata box; this ID field is designated as A0 by the software tool 20 for this metadata box.

Based on receiving the reference data May 8, 2009, the software tool 20 is configured to evaluate the value fields for each of the other identifications shown in the metadata boxes in FIG. 7. In some cases for the value field, the software tool 20 may input a year such as 2009 to go along with the (time relevant words) month and/or day as shown for IDs A3, A4, and A5. For time relevant words that do not have part of a date, the software tool 20 is configured to input a value such as week of May 8, 2009, when the time relevant words were "this week". The software tool 20 is configured to recognize words denoting past, present, and future and input a value accordingly based on the given reference date. If a time relevant phrase was "past year", the software tool 20 is configured to determine that the past year from reference date May 8, 2009 is the year 2008; as such, the software tool 20 would input year of 2008 in the value field for the time relevant words past year.

Also, since the time relevant word week is in close proximity (e.g., no intervening words, less than five intervening words, etc.) to the reference date May 8, 2009, the software tool 20 is configured to determine that the time relevant word week for ID A2 is not an ambiguous time relevant term; as such, the software tool 20 inputs none for both the attribute and value fields for the ID A2. For the IDs A1, A3, A4, and A5, the software tool 20 inputs time and date in the respective attribute fields.

Figure 8:
FIG. 8 illustrates a metadata table of the assigned/attached fields respectively corresponding to identified time relevant words and phrases, in which the metadata table is embedded in a media object according to an exemplary embodiment.

For all the metadata boxes in FIG. 7, the software tool 20 is configured to create metadata table 800 of the assigned/attached fields respectively corresponding to the identified time relevant words and phrases and embed the metadata table 800 into the media object 360, which is illustrated in FIG. 8. As the author and/or software tool 20 assigns special attributes and values to each of the time relevant words/terms/phrases, the software tool 20 saves this data in the media object 360 itself and/or in the memory 15. If the metadata table 800 is initially saved separately from the media object 360, the software tool 20 is configured to embed the data of the metadata table 800 directly into the (document) media object 360 where it can be utilized later by the software tool 20. In one implementation, the software tool 20 may be integrated in a word processing application and/or presentation application, and this application can then display on the display 45 the data of the metadata table 800. Reference for assigning and embedding data can be made to application Ser. No. 12/555,171 filed Sep. 8, 2009.

When the saved (document) media object 360 is opened, the application (word processing application, document reader application, etc.) integrated with the software tool 20 can be used to read and apply the embedded data of the metadata table 800 to respective time relevant words and phrases. For example, when viewing the (document) media object 360 on the display 45, the reader will see the highlighted words (displayed by the software tool 20) as shown in the view 900 of FIG. 9. The saved information of the metadata table 800 can be displayed possibly through a mouse over command with the user interface 50 (and/or by a right mouse click), in which case, the embedded special attribute and value box will be displayed as shown in the view 900. Each box shows the attribute and value for one of the indentified time relevant words and/or phrases.

For HTML (hyper text markup language) media objects 360 (documents), the software tool 20 can automatically update the meta tag keywords with the data from the value field of the metadata table 800, thereby allowing search engines (such as the search engine 335) to utilize this data of the value field. The meta tags are enclosed in the HTML head section by the software tool 20. An example is provided below:

```
<HEAD>
<TITLE>DOCUMENT A</TITLE>
<META name="description" content="This is my document.">
```

-continued

```
<META name="keywords" contents="TimeX, TimeY, TimeZ">
</HEAD>
```

As seen in the above example, the software tool 20 is configured to enter an actual date (value of the value field) in the keywords for the media object 360 as meta tags, which can be searched for and located by the search engine 335.

FIG. 10 illustrates a method 1000 for identifying time context in a media object (e.g., media object 360) to attach/embed meta tags for the time context in the media object according to an exemplary embodiment. Note that the processes and features discussed herein can additionally and/or alternatively be provided as a software service to the user via the server 305.

The software tool 20 executing on the computing device 10 is configured to receive input of the media object 360 having potentially ambiguous time relevant words and phrases at block 1005. The media object 360 may be scanned in by the scanner 55, selected by the user, received in an email over the network 320, and/or downloaded over the Internet, e.g., the network 320.

At block 1010, the software tool 20 is configured to identify each of the time relevant words in the media object 360 for display to a user (e.g., author, editor, etc) as shown in FIG. 6. The highlighted boxes are displayed (by the software tool 20) on the display 45 to identify each of the time relevant words in the media object 360. The original document of the media object 360 is shown in FIG. 1 before the software tool 20 has scanned and identified the time relevant words.

The software tool 20 is configured to display the time relevant words identified in the media object 360, where the time relevant words are displayed on the display 45 by the software tool 20 with an option for the user to enter values for each of the time relevant words at block 1015. As seen in FIG. 7, for each time relevant/sensitive word and phrase, the software tool 20 may display a metadata box with a value field (along with other fields) corresponding to a time/date attribute so that the user can enter the value for this time relevant word. The values (e.g., in the value field of the metadata table 800) are respectively included in meta tags, e.g., the value can be extracted from the metadata table 800 by the software tool 20.

At block 1020, the software tool 20 is configured to assign the meta tags to the time relevant words in the media object 360, such that the meta tags include the values respectively corresponding to each of the identified time relevant words. The software tool 20 is configured to embed the meta tags having the values for the time relevant words in the media object 360, such that the meta tags in the media object 360 are available for searching and indexing by the web crawlers 340 at block 1025. Also, instead of storing the meta tags in the media object 360, the software tool 20 can attach the meta tags to the media object 360 such that the meta tags are stored externally in memory 15.

The time relevant words may include individual words and phrases, which can include numbers. Also, the values of the meta tags may include a date in which the date includes at least one of a year, month, day, hours, minutes, seconds, and fractions thereof. It is contemplated that other delineations of time may be utilized and the values corresponding to time relevant words are not meant to be limited. Additionally, the software tool 20 may be configured to account for different time zones for the values of the meta tags, and may provide absolute time references for time zones, e.g., based on Greenwich Mean Time (GMT).

The values of the meta tags can include a date and at least one of a reference to a week, a reference to a month, a reference to a year, a reference to a holiday, a reference to a time period (e.g., "now", "yesterday", "tomorrow", etc.), a reference to a time preceding a time period (e.g., "the last year", "last month", "yesterday", etc.), a reference to time succeeding a time period (e.g., "next week", "next month", "next day", "tomorrow"), and a reference to a time/date currently with a time period (e.g., day/week/month of May 8, 2009, year of 2009).

Additionally, the software tool 20 is configured to automatically enter values for each of the time relevant words, such that the values are utilized in the meta tags. For example, in response to the user entering a reference date (e.g., such as May 8, 2009 highlighted in FIG. 6) for the media object 360, the software tool 20 is configured to respectively calculate values for each of the time relevant words in the media object 360 based on this given reference date. The software tool 20 is configured to increase and decrease the reference date May 8, 2009 by the meaning of the time relevant word, and to add a time period to go along with the word in a value field. The corresponding amount to increase and decrease a reference data for a given time relevant words and phrases may be stored in the database 25 for access by the software tool 20. For example, if the time relevant word is "yesterday", the software tool 20 is configured to decrease the reference date by 1 day, such that the input value is May 7, 2009 to correspond with the time relevant word "yesterday". The same analogy applies for any type of time relevant words and phrases. The media object 360 can be any type of electronically stored object including a multimedia file, an audio file, a soft copy of a document, etc.

Note that time relevant words, time relevant expressions, time relevant references, time relevant phrases, etc., are not meant to be limiting and may include words, terms, numbers, symbols, punctuations, audio, any form of character, and any combination thereof.

Figure 11:
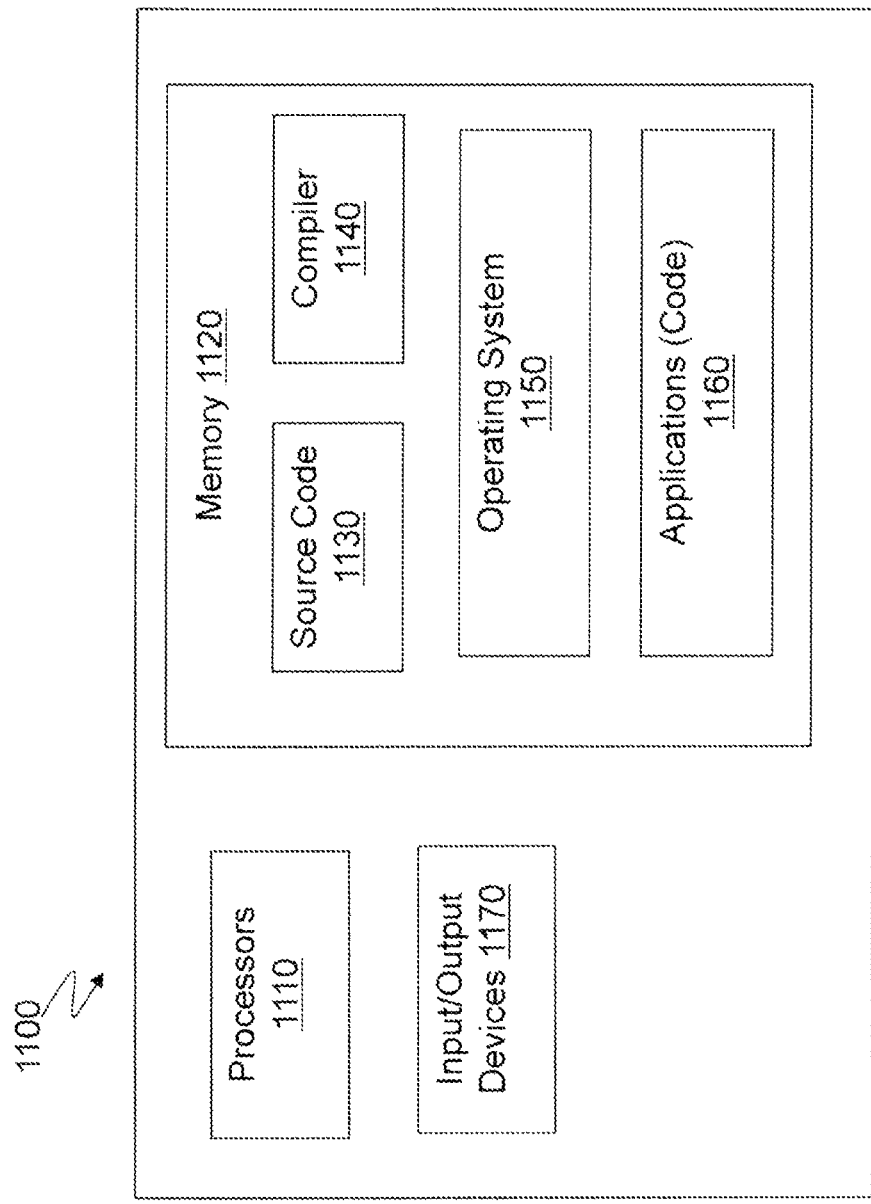
FIG. 11 illustrates an example of a computer having capabilities, which may be included in exemplary embodiments.

FIG. 11 illustrates an example of a computer 1100 having capabilities, which can be included in exemplary embodiments. Various methods, procedures, modules, flow diagrams, tools, application, and techniques discussed herein may also incorporate and/or utilize the capabilities of the computer 1100. Moreover, capabilities of the computer 1100 may be utilized to implement features of exemplary embodiments discussed herein. One or more of the capabilities of the computer 1100 may implement any element discussed herein such as but not limited to the computing devices/servers 10, 305, 330, and 355. Also, functionality of the computer 1100 may be utilized in the scanner 55.

Generally, in terms of hardware architecture, the computer 1100 may include one or more processors 1110, computer readable storage memory 1120, and one or more input and/or output (I/O) devices 1170 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1110 is a hardware device for executing software that can be stored in the memory 1120. The processor 1110 can be virtually any custom made or commercially available processor, a central processing unit (CPU), a data signal processor (DSP), or an auxiliary processor among several processors associated with the computer 1100, and the processor 1110 may be a semiconductor based microprocessor (in the form of a microchip) or a macroprocessor.

The computer readable memory 1120 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1120 may incorporate electronic, magnetic, optical, and/or other types of storage media. Note that the memory 1120 can have a distributed architecture, where various components are situated remote from one another, but can be accessed by the processor 1110.

The software in the computer readable memory 1120 may include one or more separate programs, each of which comprises an ordered listing of executable instructions for implementing logical functions. The software in the memory 1120 includes a suitable operating system (O/S) 1150, compiler 1140, source code 1130, and one or more applications 1160 of the exemplary embodiments. As illustrated, the application 1160 comprises numerous functional components for implementing the features, processes, methods, functions, and operations of the exemplary embodiments. The application 1160 of the computer 1100 may represent numerous applications, agents, software components, modules, interfaces, controllers, etc., as discussed herein but the application 1160 is not meant to be a limitation.

The operating system 1150 may control the execution of other computer programs, and provides scheduling, input-output control, file and data management, memory management, and communication control and related services.

The application(s) 1160 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 1160 may be a source program, executable program (object code), script, or any other entity comprising a set of instructions to be performed. When a source program, then the program is usually translated via a compiler (such as the compiler 1140), assembler, interpreter, or the like, which may or may not be included within the memory 1120, so as to operate properly in connection with the O/S 1150. Furthermore, the application 1160 can be written as (a) an object oriented programming language, which has classes of data and methods, or (b) a procedure programming language, which has routines, subroutines, and/or functions.

The I/O devices 1170 may include input devices (or peripherals) such as, for example but not limited to, a mouse, keyboard, scanner, microphone, camera, etc. Furthermore, the I/O devices 1170 may also include output devices (or peripherals), for example but not limited to, a printer, display, etc. Finally, the I/O devices 1170 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1170 also include components for communicating over various networks, such as the Internet or an intranet. The I/O devices 1170 may be connected to and/or communicate with the processor 1110 utilizing Bluetooth connections and cables (via, e.g., Universal Serial Bus (USB) ports, serial ports, parallel ports, FireWire, HDMI (High-Definition Multimedia Interface), etc.).

When the computer 1100 is in operation, the processor 1110 is configured to execute software stored within the memory 1120, to communicate data to and from the memory 1120, and to generally control operations of the computer 1100 pursuant to the software. The application 1160 and the O/S 1150 are read, in whole or in part, by the processor 1110, perhaps buffered within the processor 1110, and then executed.

When the application 1160 is implemented in software it should be noted that the application 1160 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 1160 can be embodied in any computer-readable medium 1120 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 1120 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W, DVD, Blue-ray™, tape, etc) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 1160 is implemented in hardware, the application 1160 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 1100 includes non-limiting examples of software and hardware components that may be included in various devices, servers, and systems discussed herein, and it is understood that additional software and hardware components may be included in the various devices and systems discussed in exemplary embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" or PLX programming language or other similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for identifying time context in a media object to provide meta tags for the time context in the media object, the method comprising:
    receiving, by a software tool executed on a computing device, input of the media object comprising time relevant expressions;
    identifying each of the time relevant expressions in the media object for display to a user;
    displaying the time relevant expressions identified in the media object, the time relevant expressions displayed by the software tool with an option for the user to enter values for each of the time relevant expressions;
    wherein the values are respectively comprised in the meta tags; and
    assigning the meta tags to the time relevant expressions in the media object, the meta tags comprising the values respectively corresponding to each of the time relevant expressions,
    wherein the software tool is further executed on the computing device to perform at least one of:
    embedding the meta tags having the values for the time relevant expressions in the media object, such that the meta tags in the media object are available for searching and indexing; and
    attaching the meta tags having the values for the time relevant expressions to the media object; and
    wherein the time relevant expressions comprise individual words and phrases.

2. The method of claim 1, wherein the values of the meta tags comprise a date in which the date comprises at least one of a year, month, day, hour, minute, second, and fractions thereof.

3. The method of claim 1, wherein the values of the meta tags comprise a date and at least one of a reference to a week, a reference to a month, a reference to a year, a reference to a holiday, a reference to a time period, a reference to a time preceding a time period, a reference to a time succeeding a time period, and a reference to a time currently with a time period.

4. The method of claim 1, wherein the software tool is configured to enter the values for each of the time relevant expressions, such that the values are utilized in the meta tags.

5. The method of claim 1, wherein, in response to the user entering a reference date for the media object, the software tool is configured to respectively calculate the values for each of the time relevant expressions in the media object based on the reference date.

6. The method of claim 1, wherein the media object comprises at least one of a multimedia file, an audio file, and a soft copy of a document.

7. A computer program product embodied on a non-transitory computer readable medium comprising computer executable instructions to execute the method of claim 1.

8. A computing device configured for identifying time context in a media object to provide meta tags for the time context in the media object, comprising:

a processor;
a software tool that operates on the processor
receive input of the media object comprising time relevant expressions; identify each of the time relevant expressions in the media object for display to a user;
display the time relevant expressions identified in the media object, the time relevant expressions displayed with an option for the user to enter values for each of the time relevant expressions;
wherein the values are respectively comprised in the meta tags; and
assign the meta tags to the time relevant expressions in the media object, the meta tags comprising the values respectively corresponding to each of the time relevant expressions,
wherein the software tool is further operated on the processor to perform at least one of:
embedding the meta tags having the values for the time relevant expressions in the media object, such that the meta tags in the media object are available for searching and indexing; and
attaching the meta tags having the values for the time relevant expressions to the media object; and
wherein the time relevant expressions comprise individual words and phrases.

9. The device of claim 8, wherein the values of the meta tags comprise a date in which the date comprises at least one of a year, month, day, hour, minute, second, and fractions thereof.

10. The device of claim 8, wherein the values of the meta tags comprise a date and at least one of a reference to a week, a reference to a month, a reference to a year, a reference to a holiday, a reference to a time period, a reference to a time preceding a time period, a reference to a time succeeding a time period, and a reference to a time currently with a time period.

11. The device of claim 8, wherein the software tool is configured to enter the values for each of the time relevant expressions, such that the values are utilized in the meta tags.

12. The device of claim 8, wherein, in response to the user entering a reference date for the media object, the software tool is configured to respectively calculate the values for each of the time relevant expressions in the media object based on the reference date.

13. The device of claim 8, wherein the media object comprises at least one of a multimedia file, an audio file, and a soft copy of a document.

* * * * *